United States Patent [19]

Menn

[11] Patent Number: 4,633,227
[45] Date of Patent: Dec. 30, 1986

[54] PROGRAMMABLE KEYBOARD FOR A TYPEWRITER OR SIMILAR ARTICLE

[75] Inventor: Walter A. Menn, Stamford, Conn.

[73] Assignee: ITT Corporation, New York, N.Y.

[21] Appl. No.: 559,128

[22] Filed: Dec. 7, 1983

[51] Int. Cl.[4] .............................................. G01G 3/00
[52] U.S. Cl. ........................ 340/365 VL; 340/365 R; 340/711; 400/486
[58] Field of Search ............ 340/365 R, 365 VL, 706, 340/711, 712; 400/172, 485, 486; 200/5 A

[56] References Cited

U.S. PATENT DOCUMENTS

| | | | |
|---|---|---|---|
| 3,200,375 | 8/1965 | Lutz | 340/365 VL |
| 3,847,263 | 11/1974 | X | 400/486 |
| 4,078,257 | 3/1978 | Bagley | 340/365 VL |
| 4,124,843 | 11/1978 | Bramson | 340/711 |
| 4,244,659 | 1/1981 | Malt | 400/486 |
| 4,352,959 | 10/1982 | Warnecke | 340/712 |
| 4,459,581 | 7/1984 | Wilson | 340/365 VL |
| 4,480,932 | 11/1984 | Willcox | 400/172 |
| 4,544,276 | 10/1985 | Horodeck | 340/711 |
| 4,551,717 | 11/1985 | Dreher | 340/712 |

FOREIGN PATENT DOCUMENTS 197803 3/1978 France .......................... 340/365 VL

OTHER PUBLICATIONS

Johnson, Jr., "Keyboard With Changeable Encoding and Key Designation," IBM Technical Disclosure Bulletin, vol. 13, No. 7, Dec. 1970.
Cooper and Harrison, "Changeable Array Keyboard," IBM Technical Disclosure Bulletin, vol. 11, No. 5, Oct. 1968.
Ghosh and Langdon, "Electronically Changeable Keyboard," IBM Technical Disclosure, vol. 23, No. 3, Aug. 1980.
T. R. Reid, Article in Washington Post entitled, "It May Be Taps for the Qwerty Keyboard" Apr., 1985.

*Primary Examiner*—John W. Caldwell, Sr.
*Assistant Examiner*—Michael F. Heim
*Attorney, Agent, or Firm*—Peter C. Van Der Sluys; Robert A. Hays

[57] ABSTRACT

There is disclosed a programmable keyboard apparatus for allowing a user to select any one of a predetermined number of different keyboard arrangements such as the Qwerty or the Dvorak arrangements. The keyboard contains a plurality of fixed input keys arranged in rows and columns and according to a standard typewriter keyboard format. Each key has positioned above the key an indicating area whereby the designation or symbol for the key is automatically changed by the apparatus each time a different format is selected. In this manner, the user can experiment with keyboard formats which enable more rapid typing with fewer errors. The construction is extremely economical, and therefore, in utilizing the apparatus a user will have access to different keyboard arrangements which will increase the users ability to type or enter data.

The keyboard disclosed can be used as a computer keyboard which will also enable a rapid change of symbols while permitting the operator to view the symbols for each different format through the respective windows.

9 Claims, 13 Drawing Figures

PROGRAMMABLE KEYBOARD FOR A TYPEWRITER OR SIMILAR ARTICLE

BACKGROUND OF THE INVENTION

This invention relates to a keyboard arrangement in general and more particularly to a typewriter keyboard arrangement which can be programmed to indicate a plurality of different formats.

As one can ascertain, the standard typewriter keyboard which is still in use today was developed in the 1860s by C. L. Sholes. Essentially, the keyboard was originally arranged so that the most frequently used letters were placed as far apart as possible to prevent the typist from striking the keys more rapidly than the mechanical mechanism could accommodate.

The standard typewriter keyboard, as indicated above, is referred to as the Qwerty keyboard which letters designate the alphabetical sequence of the second row of keys from left to right. It has been uniformly stated that this keyboard seriously affects the speed at which a typist can perform due to the antiquated structure, but based on the way typing is taught and based on the wide spread availability of typewriters using this format, the Qwerty keyboard is still in wide spread use. It is, of course, obvious that in today's technical society, the mechanical constraints of antiquated typewriters have been completely overcome, but the keyboard is still widely employed even though it was deliberately designed to reduce the speed of data input.

Many people are cognizant of these problems, and over the course of time several improved keyboard arrangements have been developed and are widely known such as the Dvorak, the Montgomery as well as various different arrangements. Essentially, these keyboards have the alphanumeric characters prearranged to afford substantial improvement in terms of speed and accuracy of keyboard entry. The proponents of such systems are many, and a great deal of literature exists in the prior art extolling the virtues of alternate keyboard systems using such arrays.

See for example an article entitled "Bringing Manual Input into the Twentieth Century-New Keyboard Concepts" published in *Computer* (IEEE, Mar. 3, 1982 by E. B. Montgomery). See also an article entitled "Will There Ever be an Efficient Keyboard" published in *High Technology*, January 1983 by Cary Lu.

Essentially, such articles, as well as many other references, recognize the need for improving the keyboard format to gain increased speed and efficiency. In spite of such considerations, the improved keyboard arrangements have not been widely accepted. A major reason for this is that the Qwerty keyboard arrangment is presently inflexible as existing typewriters have designated labeling on the key tops, and therefore, can only support the antiquated key configuration.

A review of the prior art will indicate that there are many patents and articles which propose various schemes for changing the labeling of keys on a keyboard to facilitate different operations when a key is depressed. In any event as will be further explained, the typewriter possesses some unique qualities which must be complied with in order to furnish a product consistent with custom and usage of the apparatus. It is believed that in order for the various improved keyboard formats to be adopted, one will have to supply a typewriter or keyboard which is capable of utilizing a number of selected formats in order to enable the operator to familiarize himself with systems other than the Qwerty arrangement.

Essentially, one must provide a single keyboard which has the capability of being programmed to present different keyboard arrangements as well as the standard Qwerty arrangement. In this manner, the keyboard could be used by those presently trained in touch typing and by those trained in improved keyboard techniques.

Based on the advanced technology of today and the availability of microprocessor control at low-cost, this approach appears to be entirely feasible and economical. In any event as will be explained, the human engineering factors in developing such a keyboard are considerable as well as the fact that one must provide a reliable and economical arrangement whereby different keyboard formats can be accessed according to the desires of a user and in a rapid and efficient manner.

As alluded to above, the concept of electronically or mechanically changing key legends for various purposes is well known in the prior art. Prior art references indicate that a great deal of work has been expended on various keyboards. In any event, there are few prior art references which attempt to solve the problem inherent in the touch type keyboard as utilized for example in a typewriter.

A number of prior art patents such as U.S. Pat. No. 4,078,257 entitled CALCULATOR APPARATUS WITH ELECTRONICALLY ALTERABLE KEY SYMBOLS, issued on Mar. 7, 1978 to A. S. Bagley to relate to the changing of key symbols on a keyboard. This patent and others depict a way of electronically labeling and relabeling a limited set of keys to access a large number of different functions that may be programmed into a calculator. The objective of such patents is not applicable to the concepts described herein in the sense that they relate to a large number of functions which have no particular orientation or position in regard to a keyboard format as they do not relate to the single function of optionally transferring alphanumeric data onto a paper or display.

As one will ascertain, the systems are extremely complicated and do not address themselves to a common keyboard format which has been extensively and widely utilized.

Examples of other patents which employ similar concepts as indicated above can be had by reference to U.S. Pat. No. 2,801,121, U.S. Pat. No. 4,313,108 and U.S. Pat. No. 3,200,375. Other patents such as U.S. Pat. No. 4,326,193 entitled TERMINAL WITH INTERCHANGEABLE APPLICATION MODEL, issued on Apr. 20, 1982 to T. J. Markley et al. This patent uses a flexible membrane keyboard which includes a keyboard overlay that is employed to change keyboard symbols dependent upon various applications. Other patents employ similar techniques and provide overlays for changing the keyboard legend. The problems with such approaches are many.

A major problem is that the use of overlays is extremely inconvenient as such overlays can be damaged, lost or misplaced as well as the fact that the keyboard arrangement utilizes switches which are not acceptable for use in implementing a typewriter keyboard arrangement. Such switches as membrane switches do not provide adequate mechanical feedback and will not conform to the requirements set by various standards for typewriter keyboard application.

Other examples of systems using overlays for keyboard legend change are depicted in U.S. Pat. No. 3,187,321 as well as U.S. Pat. No. 3,200,375. Essentially, many prior art patents as of the type indicated above are concerned with changing the keyboard legend in calculating devices where the device can perform many more functions than the keyboard has keys to accommodate. Hence in regard to the calculator art it has been a consistent objective to afford legend changes according to the performance of a different mathematical operation. Hence other patents such as U.S. Pat. No. 4,181,966, U.S. Pat. No. 4,185,282, U.S. Pat. No. 4,124,843, U.S. Pat. No. 4,313,108, U.S. Pat. No. 4,280,121 and U.S. Pat. No. 4,336,530, as well as many other patents depict various techniques for changing the legend of individual keys or groups of keys associated with an arbitrary keyboard arrangement.

If one reviews the type of prior art depicted in the above noted patents, one will realize that there are extreme problems in adapting the prior art techniques to the formulation of a typewriter keyboard which is programmable and capable of providing different formats. These difficulties reside in the design of the key utilized in such devices as well as the manner in which the changed legend appears on the keyboard which factors as well as many others render such approaches impractical for us in a typewriter keyboard array. Apart from such factors is that many of the prior art techniques are extremely difficult to implement, are expensive and are not associated with the reliability inherent in modern day typewriters.

It is, therefore, an object of the present invention to provide a keyboard for a typewriter or for data entry which enables one to rapidly and reliably change the format and key legend in a simple and efficient manner. It is a further object to provide a keyboard for a typewriter or similar article which is capable of being programmed to enable a user to select a particular key arrangement implemented on a conventional typewriter keyboard structure.

It is a further object to provide an improved typewriter keyboard where the key positions and spacings are provided according to modern day standards and layout requirements. A further object of the invention is to provide a programmable keyboard incorporating a display for each key and which display is intimately associated with the key.

BRIEF DESCRIPTION OF THE PREFERRED EMBODIMENT

A programmable keyboard apparatus for allowing a user to select any one of a predetermined number of keyboard arrangements to enable the entry of alphanumeric data said keyboard comprising a plurality of fixed input keys arranged in rows and columns according to a standard typewriter keyboard format, separate indicating areas, each one associated with one of said keys and positioned proximate to each key in said format for selectively displaying a proper symbol associated with said key and indicative of a character to be provided by said key according to said selected arrangements, selector means associated with said indicating areas and capable of selecting any one of said predetermined number of arrangements to cause each indicating area to display that symbol associated with that character to be furnished by said key according to said selected arrangement.

BRIEF DESCRIPTION OF THE INVENTION

Figure 1:
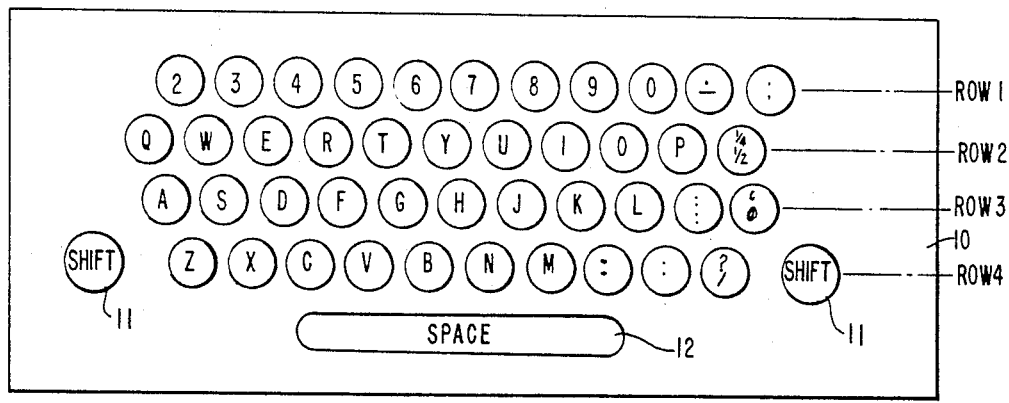
FIG. 1 is a top plan diagrammatic view of a Qwerty keyboard.

Referring to FIG. 1, there is shown a top plan view of the Qwerty keyboard 10. Essentially, as one can see, the keyboard contains four rows of keys with the top row having eleven keys and containing numerical indications. The second row also has eleven keys, and essentially, the sequence in characters in this letter row indicates why the keyboard is called Qwerty when looking at the second row from left to right. The third row also has eleven keys which are mainly letter keys with the fourth or bottom row having ten keys.

A shift key as 11 is positioned on either side of the keyboard adjacent the bottom row with the space bar 12 underlying the keyboard. As indicated in the Background of the Invention, the keyboard of FIG. 1 was developed by the inventor Sholes so that operation was deliberately slowed down to prevent mechanical difficulty while typing. In any event, as indicated, this is the keyboard utilized today in standard typewriters as well as in computers.

Figure 2:
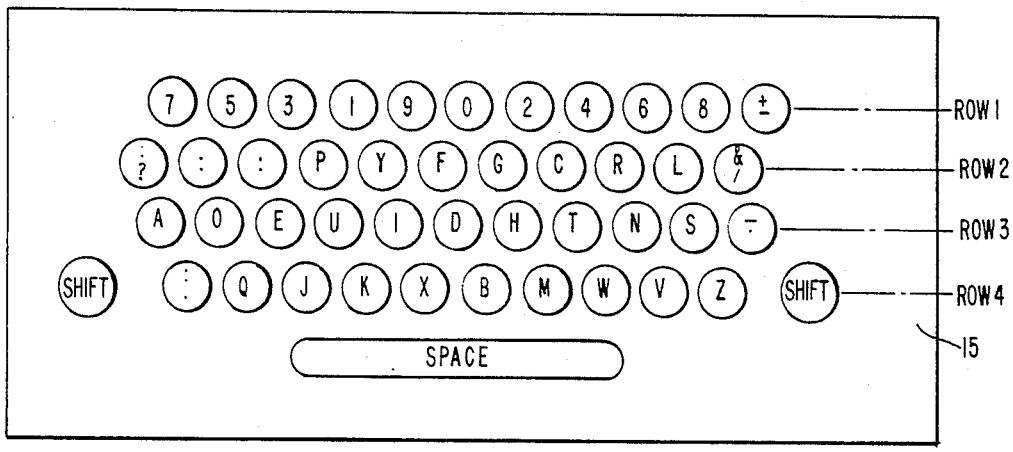
FIG. 2 is a top plan diagrammatic view of a Dvorak keyboard.

Referring to FIG. 2, there is shown a keyboard 15 which was developed by August Dvorak, a professor of education, and who rearranged the letters according to use. The keyboard depicted in FIG. 2 provides an optimum arrangement of letters which enables an operator trained in utilizing the keyboard to type at a much more rapid rate with greater accuracy.

Referring to FIG. 2, it is seen that the keyboard also consists of four rows of keys which are staggered based on the format. The top row of the Dvorak keyboard contains numeral keys which are 11 in number as do rows 2 and 3 with the bottom row or fourth row also containing ten keys with the shift keys and space bar arranged as in the Qwerty keyboard of FIG. 1. Apart from both keyboards depicted in FIGS. 1 and 2, there has been suggested a number of alternative keyboards which also utilize a staggered arrangement of keys in four rows and which depict different numerals and letter arrangements to enable a typist to type at a faster rate with greater accuracy. It is, of course, apparent and understood that the Dvorak keyboard arrangement is far superior to the Qwerty and affords a speed improvement of between 5 to 25 percent with roughly about one half the errors.

The difference between the keyboards is that in the Dvorak board the balance between the left and right hand usage is better. Hence in the Dvorak keyboard many more characters and common words can be typed using just the home row keys which are the keys in the third row, and hence the keyboard requires much less hand movement and jumping from row to row.

As was above indicated and as one will ascertain from referring to FIGS. 1 and 2, the function associated with each key is printed or otherwise indicated directly on the key surface which is an extremely common factor in regard to most presently existing keyboards.

As alluded to above, there are other arrangements developed by other people which even afford a more rapid access to various letters as extensive studies have been made concerning the increase in speed and accuracy by affording rearrangement of the letters and numerals. Despite such apparent advantages and despite the fact that the keyboard of FIG. 2 has been in existence for one-half century, the actual number of keyboards available according to the format of FIG. 2 is extremely small. The reasons for this are many, as people are not trained in utilizing the keyboard apart from the fact that few people are willing to learn to use the keyboard due to the fact that it is not uniformly available apparatus.

It is, of course, apparent that in order to obtain the advantages of utilizing the system or other systems, one must be able to have access to such a keyboard. As will be explained the primary object of this invention is to provide a keyboard which can be programmed in a rapid and reliable manner to assume any one of a number of different arrangements to facilitate rapid typing with increased efficiency.

Figure 3:
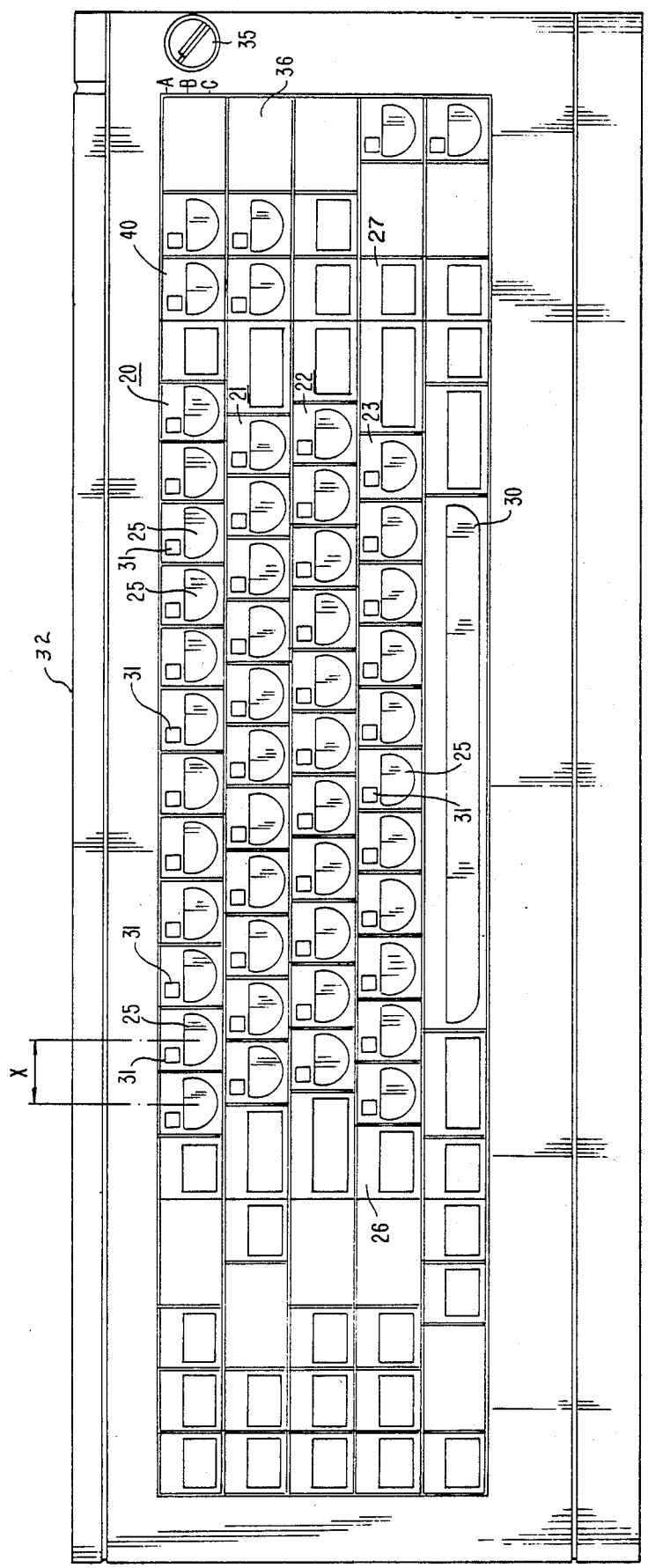
FIG. 3 is a top plan view of a programmable keyboard arrangement according to this invention.

Referring to FIG. 3, there is shown a top plan view of a keyboard arrangement according to this invention.

Essentially, the keyboard consists of four rows, 20, 21, 22 and 23, of staggered keys 25 wherein the top row has twelve keys. The second row has eleven keys, the third row has eleven keys and the fourth row or bottom row has eleven keys. The keys, although different in number from that found in the keyboards depicted in FIGS. 1 and 2, can easily accommodate such configurations as will be immediately apparent. The keys 25 are movably mounted on a housing 32 which as shown is rectangular in configuration and is relatively conventional in format. The total key area as depicted is approximately 98 mm in height and 412 mm in length, although the effective keyboard area which includes the partial circular key configurations is about 390 mm in length. This is the typical size of a conventional keyboard.

As indicated, the keyboard differs from the Qwerty keyboard in that the top row has one more key and the bottom row has one more key. This is strictly a matter of convenience and, as will be explained, enables one to implement other keyboard formats.

The rectangular sections which appear adjacent to the keys such as 26 and 27 can be utilized for shift key operation, while the space bar 30 is located below the keyboard format. As one will immediately ascertain from FIG. 3, each key appears in the top plan view as a partial circle which contains 10 to 30 degrees of more area than a semicircle. The key has a circular bottom periphery with a flat top edge as shown in the Figure.

Positioned above, i.e. proximate, each key is a window 31 which window will display the letter or character associated with that key during each keyboard display. In order to change the format of a keyboard, there is shown a circular knob 35 which knob is rotatable to three different positions as designated by the leters A,B and C. Each position is capable of selecting a completely different keyboard format. Consequently, the operator, by rotating the knob from A to B to C, may select a different keyboard arrangement and can proceed to utilize the keyboard according to the selected arrangement. For example, rotation of knob 35 to position A will cause each of the windows as windows 31 to display the Qwerty keyboard pattern and hence all the keys will be indicated by the arrangement shown in FIG. 1. If rotation is made to position B, the widows will then display the Dvorak arrangement of FIG. 2. Hence each key will be operated according to that format. Position C may be associated with a completely different keyboard arrangement such as other keyboards which exist and are known in the prior art.

The apparatus may further include a display panel such as panel 36 which will display the name or other indication of the keyboard panel. Apart from the ability to select different keyboard arrangements, it is immediately noted that the keyboard depicted differs from prior art keyboards in the shape of the keys, being a terminated partial circle having a flat top with a window positioned above the key. In this manner the operator can immediately see or visualize each of the indications displayed in the windows, and during typing, the finger of the operator will not cover the legend as displayed in the window 31. The shape of the keys facilitates clearance for the user's fingernails, while the key has a top concave surface.

It is also indicated that the key surface as shown in FIG. 3 leads to an optimum feel and enables a more reliable strike by the finger of the operator. The keys in each row are typically spaced apart from center to center as designated by X to be 19.0 mm. The key is basically 19 mm high and has a nonclear key top surface. More importantly, each key is selected so that it is a mechanically depressed key which provides mechanical feedback to the user. This is an extremely important feature which is not available in many of the prior art keyboard arrangements which arrangements employ zero travel type keys. Mechanical key arrangements which are employed in the keyboard are available from many different companies such as that keyboard available from a company called Key Tronics. This company and others provide a keyboard which meets all of the new ergonomic standards including the German DIN requirements. Essentially, each key is a mechanical key with a spring return so that the operator does receive the necessary feedback to indicate that the key has been depressed. It is, of course, obvious that there are many embodiments and key arrangements which can be employed in this invention.

In any event, the top surface format of the key is implemented by the fabrication of a suitable plastic cover which has the configuration depicted. It is also noted that each key is surrounded by a line frame which visually isolates the key from every other key. Thus it has been found that the line frame which borders each key enables the operator to view the key and the associated window 31 with great accuracy and clarity. Other functions available on the typewriter as the back space and so on are implemented by means of other keys such as key 40 and so on.

Figure 4A:
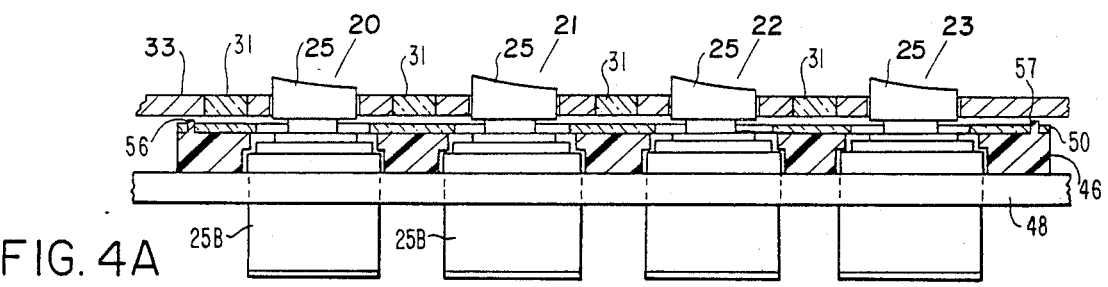
FIGS. 4A to 4E depict various views showing a mechanical selector assembly according to this invention.
Figure 7:
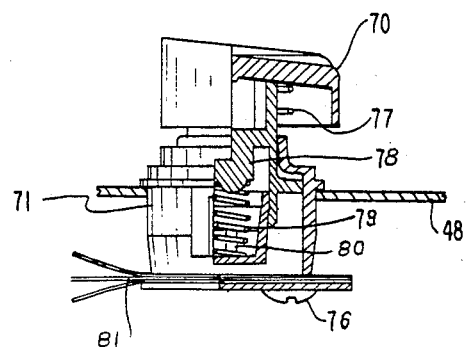
FIG. 7 is a partial cross sectional view depicting one type of mechanical key utilized in this invention.

Referring to FIG. 4A, there is shown a side sectional view of a mathematical apparatus utilized to allow one to change the keyboard display format. FIG. 4A is a typical cross sectional view where the keys 25 are shown aligned in the rows 20, 21, 22 and 23 for clear explanation. Each key 25 has the appearance as shown in FIG. 7 to be described. The base of each key 25 includes a switch portion 25B inserted into a metal chassis 48. The chassis 48 has a series of apertures stamped or otherwise machined thereon so that the switch portions of the keys can be inserted into the apertures and the keys held in place.

Figure 4C:
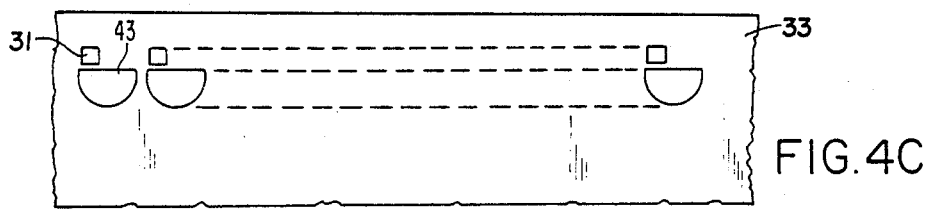
Figure 4D:
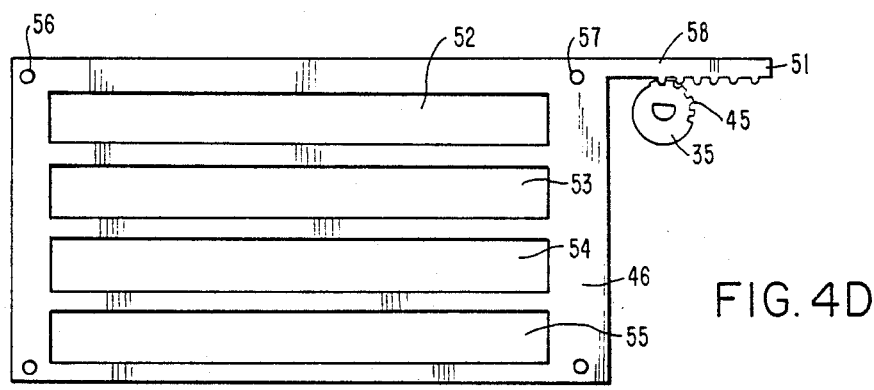
Figure 4E:
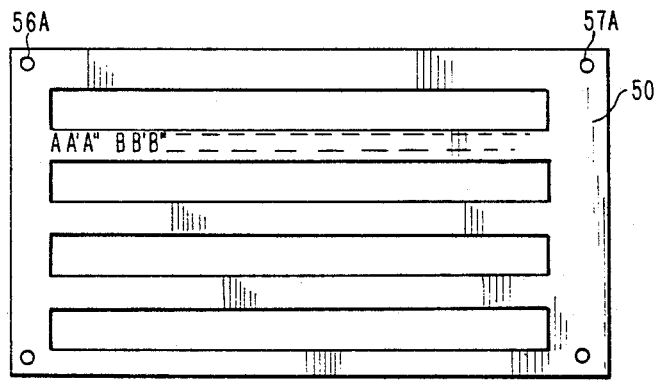
Figure 4B:
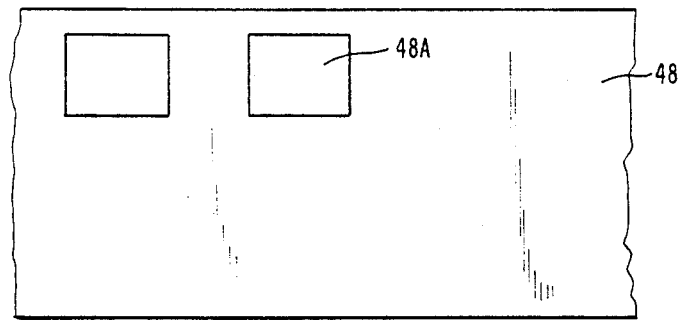

Referring to FIG. 4B, there is shown a top plan view of the chassis 48 with rectangular apertures 48A formed in the surface thereof and adapted to accommodate the switch portions 25B of keys 25. A key plate 33 forms part of the housing 32 and has a window 31 located above each key 25 as shown in FIG. 4A. The windows 31 may contain transparent plastic or may be devoid of any material allowing a viewing path.

Referring to FIG. 4C, there is shown a top partial view of plate 33 showing a key aperture 43 together with a window aperture 31. The aperture 43 of plate 33 accommodates the movable top surface of the key 25, while the aperture 31 may be filled with a transparent material. Located between the chassis 48 and plate 32 is an elongated slide member 46.

The slide member as shown in FIG. 4D has four elongated slots as slots 52 to 55. Each slot is positioned so that an associated row of keys is accommodated within the open space of the slot when member 46 is positioned over the keys in each row. The member 46 has an extending top projection 58 which consists of a rack member. The bottom surface of member 58 is a tooth-like surface which engages corresponding projections or gear teeth associated with a gear 45 which is coupled to the rotatable knob 35. Thus as the knob 35 is rotated, the entire slide member 46 moves to the left or right. It is also obvious that the extending top projection 58 may be engaged by a slide switch thereby eliminating the need for a rotary switch, the rack member, gears and knob.

Positioned on top of the slide member is a plastic sheet 50 as shown in FIG. 4E. The sheet contains indicia such as A, A', and A" which indicia appear in the windows as the slide member 46 is moved. Thus as the knob 35 is rotated, the indicia appearing within the windows of the plate is changed by the movement of the slide member 46 as coupled to the rack 58. The plastic sheet 50 is emplaced upon the slide 46 by means of the upstanding pins 56 and 57 which accommodate the apertures as 56A and 57A on the sheet 50.

The slide member 46 as seen is a single member having the four elongated openings 52 to 55 into which the rows of keys fit so that the slide member slides along the surface of chassis 48 within tracks formed by the spaces between the rows of keys.

The plastic sheet 50 has implemented thereon the different indicia for purposes of allowing the proper character to be viewed when a different keyboard is selected. Each side of the plastic sheet may include three different sets of indicia so that the sheet may be turned upside down to provide six different character formats for six different display purposes. When six sets of indicia are used, the apparatus may include an additional switch which can be accommodated easily on the format shown in FIG. 3 to indicate to the memory and to the user which side of the plastic sheet is being used.

The above noted construction is relatively simple and the key plate 33 which fits over the keyboard assembly may be secured to the chassis by any number of various means including a hinge assembly or a snap fit for easy removal and access to the plastic sheet.

Figure 5:
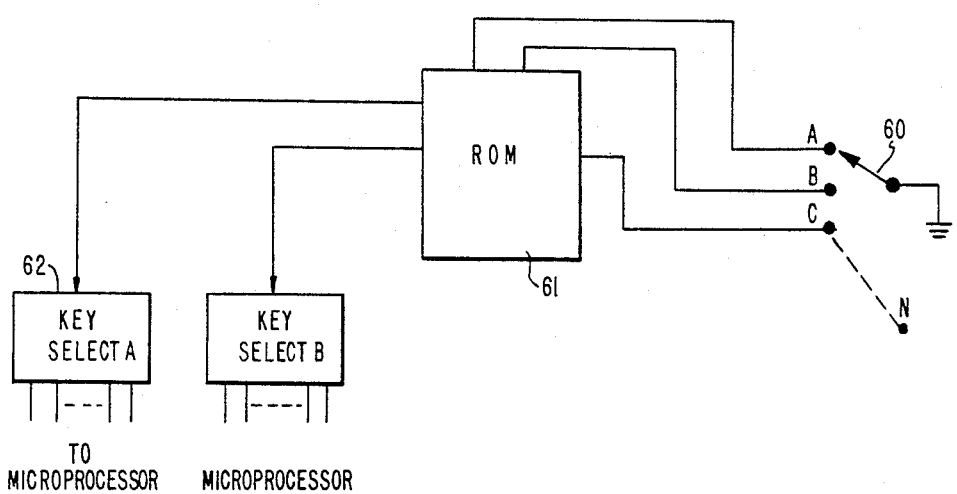
FIG. 5 is a simplified electrical schematic of circuitry utilized in changing keyboard format.

Referring to FIG. 5, there is shown an electrical schematic whereby a rotary switch 60 can be rotated from position A through position N by way of example. Each position as position A is coupled to a read-only memory or ROM 61. The ROM has stored therein the electrical code which may be a binary code for each key in a particular format. Thus in position A, the ROM will output the codes necessary to implement the Qwerty keyboard, for example. The outputs of the ROM are directed to a key select register 62 whereby the keyboard via a microprocessor will cause the appropriate character as displayed in the indicia window to be activated by the typewriter or computer upon depression of that key. There are many ways of accomplishing these functions which are well known. Essentially, in most typewriters and computer configurations, the circuitry does contain a ROM which is a look-up table which converts each key position to a character for the typewriter or computer. A few computers keep the keyboard look-up table in a RAM which is a random access memory so that the user can change the keyboard arrangement. Hence the actual conversion can be implemented in a typewriter or for a computer can be implemented very simply as shown in FIG. 5.

It is, of course, a major object of the invention to provide a window proximate to each key where the appropriate indicia as relating to a keyboard arrangment will be displayed. As one can ascertain, many typewriters employ a rotating ball which provides the proper character upon depression of a key. In such typewriters the entire ball can be replaced to thereby change the entire format of the keyboard. For example, the ball utilized for a typewriter would cause the letter Q to appear upon depression of the first left hand key in the second row. If the Q on this ball were replaced by a question mark (?) then each time the Q key would be pressed the question mark would appear and hence the Qwerty keyboard could be changed to the Dvorak keyboard by replacement of a ball. In these typewriters the invention is utilized so that the proper symbols are displayed when a new ball is utilized and hence the operator can visualize the keyboard and be trained to use the same. It is, of course, understood that many persons who type such as programmers and so on constantly look at the keyboard to verify the characters being entered.

Figure 6A:
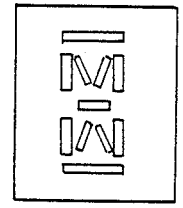
FIG. 6A is an example of a segmented display.
Figure 6B:
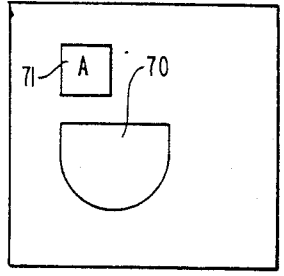
FIG. 6B is an example of a key with a window.
Figure 6:
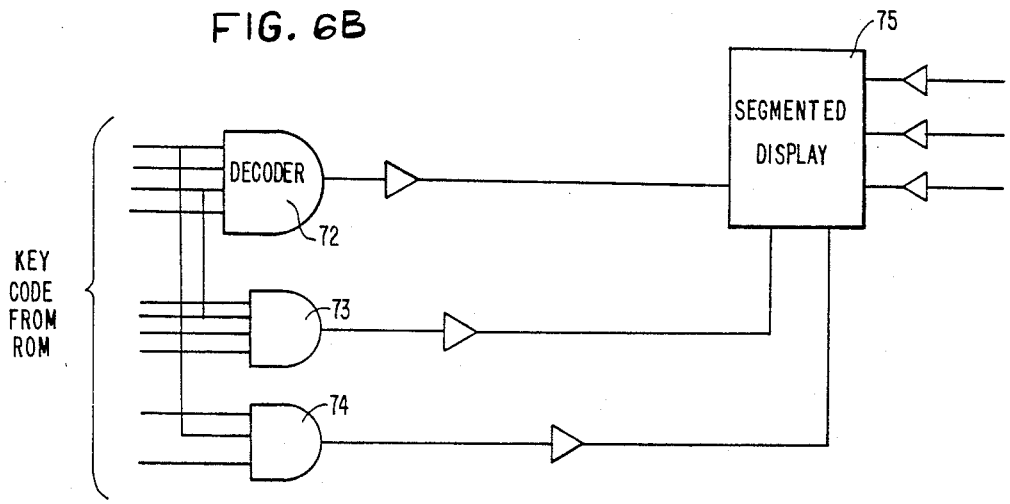
FIG. 6 depicts a key arrangement and indicating window together with circuitry for changing the indicia indicated according to a selected keyboard.

Referring to FIG. 6, there is shown still a further way of implementing the above described invention.

In FIG. 6B there is shown an example of a key 70 having a window 71 located above the key. Positioned beneath the window is a segmented LED display which displays are well known and are capable of displaying any alphanumerical symbol when activated. An example of a typical segmented display is shown in FIG. 6A and such displays are available in a wide variety of structures such as LED devices, liquid crystal devices and so on. Essentially, the segmented display is well known, and upon activation of selected segments, one can provide a display of the entire alphabet as well as numerical values from zero to nine. There are of course other types of segmented displays which can be employed as well to indicate punctuation marks as well as various other symbols normally found on the typewriter keyboard See for example a text entitled GUIDEBOOK OF ELECTRONIC CIRCUITS by John Markus, McGraw-Hill Co., 1974, Chapter 30 entitled "Display Circuits".

As indicated in FIG. 5, when a selection is made for a keyboard, the ROM 61 will contain the binary information necessary to inform the circuitry which character is to be provided when that key is depressed. In this manner, the codes for each key in a given format is stored in the ROM. Hence as shown in FIG. 6, the particular key code from the ROM is coupled to a series of decoder gates shown by way of example as 72, 73 and 74. The outputs of these decoder gates are utilized to energize a segmented display 75 which may be a LCD or LED display to enable the associated window as 71 to display that particular character associated with the particular keyboard pattern selector. The switch 70 may be a silicone rubber switch, many of which are widely available and known. The advantages of such switches are that they inherently have mechanical feedback which is implemented by the compression of the silicone rubber and therefore provides the operator with the required feeling necessary to implement keyboard functions.

Referring to FIG. 7, there is shown a partial cross sectional view of a typical key switch which may be employed to implement the keys of the keyboard shown in FIG. 3. Essentially, the key consists of a top portion 70 which is referred to as a key top. The top surface of the key top is, of course, a partial circle having a top flat edge as depicted for keys 25 in FIG. 3.

The key top is fabricated from plastic and is movably coupled to a key housing 71 which is secured to the top surface of the housing by means of a screw 76. There is a return spring 77 located within the housing which returns the key top and its quiescent position after activation. The key top has an extending arm 78 which slides or moves within the housing 71 and upon depression of the key top 70, pushes against spring 79 which is coupled to a actuator 80 to contact a flat switch 81 which is closed or operated upon depression of the key top 70. This switch and other similar types are provided by many manufacturers and as provided produces mechanical feedback so that the operator can feel or respond to the contact or closure of the switching element 77. The same type of construction can be implemented by using an elastomeric switch body which as indicated can be made from silicone rubber to also provide mechanical feedback.

Thus as can be seen, the above noted structure provides many features which are particularly adapted to implement a typewriter keyboard to enable one to change the keyboard format in a simple and reliable manner as by rotating a knob as opposed to changing templates and other procedures employed in the prior art. Each key of the keyboard has a unique top surface shape which is utilized to accommodate the finger of the user in a reliable manner. Each key is framed within the keyboard array wherein the area with the frame contains a window through which the key indicia is displayed. Each window may be illuminated for further visual viewing as the slide member and chassis shown in FIG. 4 may be made from a clear plastic with the indicia printed in a dark medium on the plastic sheet with back lighting.

The keys are the type which provide mechanical feedback through use of a full travel key as opposed to zero travel key. Such key configurations as indicated above are widely available. It is, therefore, anticipated that by supplying the apparatus as shown and described above, the public will now have easy access to different keyboard arrangements which will induce the use of the more efficient arrays to enable rapid typing with fewer errors.

In any event, the programmable keyboard described above can always be used to display the conventional Qwerty arrangement to thereby enable those skilled in that format to continue to use the same. In this manner people being trained to perform typing or keyboard entry can be trained on more efficient keyboard formats, and therefore, the frustration evidenced by past efforts will be circumvented by making efficient keyboard arrangements available for continuous use.

It is, of course, apparent that the above apparatus has multiple uses in implementing different keyboard arrangements and can be used for translation or for multilingual applications by converting characters to characters in different languages and so on.

It is therefore anticipated that the apparatus depicted above will eventually enable the widespread use of more efficient keyboard arrangements and therefore eliminate the antiquated Qwerty keyboard by making other systems available.

I claim:

1. A programmable keyboard apparatus for allowing a user to select any one of a predetermined number of keyboard arrangements to enable the entry of alphanumeric data via said keyboard, said aparatus comprising:
    a plurality of fixed input keys arranged in rows and columns according to a standard typewriter keyboard format each said key includes a top surface having a straight top edge from which extends a partial circular section with said circular section containing more than 180 degrees;
    separate indicating areas, each one associated with one of said keys and positioned proximate to each key in said format for selectively displaying a proper symbol associated with said key and indicative of a character to be provided by said key according to said keyboard arrangements, each said separate indicating area including a transparent window positioned proximate said straight top edge of said associated key;
    means, associated with said indicating areas, for selecting any one of said predetermined number of arrangements to cause each indicating area to display that symbol associated with that character to be furnished by said key according to said selected keyboard arrangement, said selector means including a switch capable of being moved into any one of a predetermined number of positions indicative of selecting a particular keyboard arrangement; and
    means, coupled to said switch, for moving a predetermined distance upon a movement of said switch said means including an elongated slide member having parallel longitudinal slots one for each row of keys with each slot positioned over an associated row of keys and having areas between said slots that are positioned beneath said transparent windows in each of said rows, and indicia means coupled to said slide with said indicia being indicative of said symbols whereby when said means is moved, said slide moves to cause a selected symbol to appear in said window indicative of said character to be provided.

2. The programmable keyboard apparatus according to claim 1, wherein a first one of said keyboard arrangements is the Qwerty arrangement.

3. The programmable keyboard apparatus according to claim 2, wherein another keyboard arrangement is the Dvorak arrangement.

4. The programmable keyboard apparatus according to claim 1, wherein each of said keys is of the type providing mechanical feedback to a user.

5. The programmable keyboard apparatus according to claim 4, wherein each of said keys is fabricated from a silicone rubber body.

6. The programmable keyboard according to claim 1, further including switching means coupled to said switch to provide a signal indicative of which one of said predetermined arrangements is selected, and memory means coupled to said switching means and operative to provide at an output a plurality of signals indicative of the character associated with each of said keys according to said selected arrangement and in response to said signal.

7. The programmable keyboard according to claim 6, further including a segmented display module positioned beneath each window and decoder means responsive to said plurality of signals for causing said display to indicate the character associated with each of said keys according to said selected arrangement.

8. The programmable keyboard according to claim 1, wherein each of said keys and said associated separate indicating areas is framed to visually separate one from the other.

9. The programmable keyboard according to claim 1, wherein said keyboard format has at least eleven keys in a top first row, with at least eleven keys in a second row underlying said first row, with at least eleven keys in a third row underlying said second row, and at least ten keys in a fourth bottom row underlying said third row.

* * * * *